United States Patent [19]

James

[11] Patent Number: 4,858,081
[45] Date of Patent: Aug. 15, 1989

[54] VEHICLE OPTICAL SAFETY APPARATUS

[76] Inventor: Terry J. James, 19545 Sherman Way, Reseda, Calif. 91335

[21] Appl. No.: 138,394

[22] Filed: Dec. 28, 1987

[51] Int. Cl.$^4$ .............................................. F21V 33/00
[52] U.S. Cl. ......................................... 362/72; 362/83
[58] Field of Search ....................... 362/61, 72, 78, 83, 362/82

[56] References Cited

U.S. PATENT DOCUMENTS

| 3,741,623 | 6/1973 | Mihalik | 362/327 |
| 4,019,171 | 4/1977 | Martelet | 362/72 |
| 4,420,797 | 12/1983 | Tohata | 362/83 |

FOREIGN PATENT DOCUMENTS

| 8105164 | 6/1983 | Netherlands | 362/72 |
| 8600055 | 1/1986 | Netherlands | 362/72 |
| 560575 | 4/1944 | United Kingdom | 362/72 |

Primary Examiner—Ira S. Lazarus
Assistant Examiner—Sue Hagarman
Attorney, Agent, or Firm—William J. Benman, Jr.

[57] ABSTRACT

An optical safety apparatus for use in a vehicle having a tension controlled braking mechanism is disclosed herein. Included in the safety apparatus is a lamp means for emitting an optical braking signal and a mounting means for securing the lamp means to the vehicle. A switch means electrically connected to the lamp means controls emission of the braking signal in response to engagement of the braking mechanism. Included in a specific embodiment is a trifunctional lamp means for emitting an optical braking signal, for reflecting incident radiant energy and for generating an optical safety signal.

3 Claims, 2 Drawing Sheets

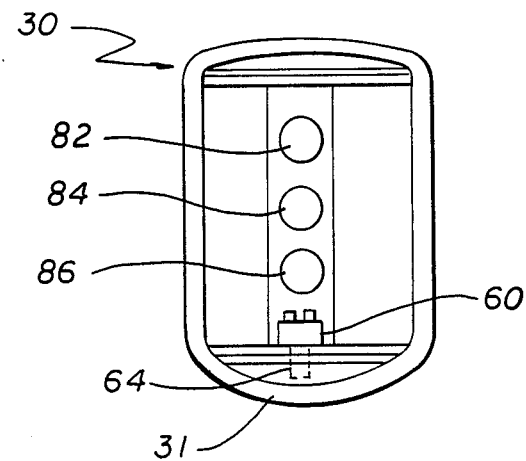
FIG. 3a
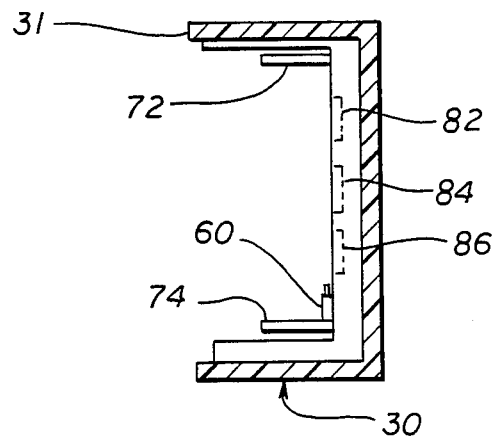
FIG. 3b
FIG. 4
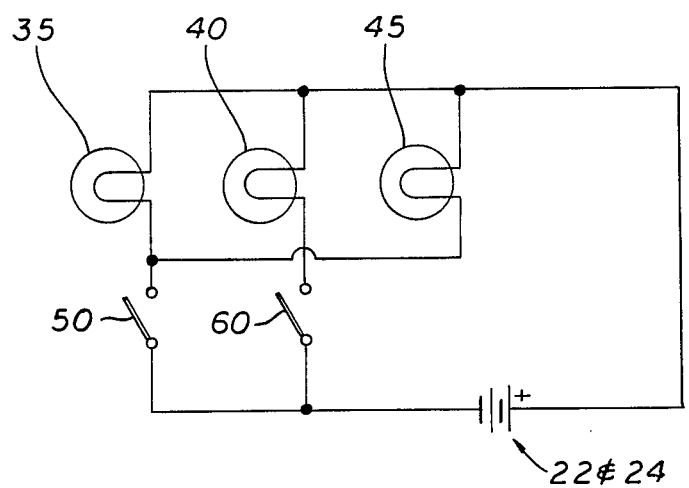

VEHICLE OPTICAL SAFETY APPARATUS

BACKGROUND OF THE INVENTION

1. Field of the Invention

This invention relates to vehicle safety systems. More specifically, this invention relates to safety systems which enhance vehicle visibility.

While the present invention is described herein with reference to a particular embodiment, it is understood that the invention is not limited thereto. Those having ordinary skill in the art and access to the teachings provided herein will recognize additional embodiments within the scope thereof.

2. Description of the Related Art

Among conventional techniques of improving vehicle visibility are those that may be characterized as passive, while other techniques may be more appropriately described as active. The utilization of plastics, paints or glass which may inherently or through processing assume optically reflective properties constitutes application of a passive technique. Alternatively, an example of an active technique of visibility enhancement might involve mounting light sources, such as automotive tail lights, on the periphery of a vehicle. Passive techniques find widespread application in all types of vehicles, while active techniques tend to be employed more often in conjunction with motorized vehicles.

Human powered vehicles, such as the bicycle, have tended to rely on passive forms of visibility enhancement for several reasons. First, although active devices such as tail lights have been fashioned for bicycles, these devices often rely on generators coupled to the bicycle tires for power. Unfortunately, generators introduce friction which tends to limit the efficiency of the apparatus. Second, active safety devices can be unwieldy and may require a separate means for mounting on a bicycle. Accordingly, bicycle manufacturers typically initially equip new bicycles with generally passive means of visibility enhancement.

Despite the difficulties of implementing active optical safety devices, these devices are still generally preferred because of the superior visibility they offer. Automobiles, motorcycles, and motor driven bicycles (mopeds) are generally required to have a rear mounted light that is activated in response to engagement of the associated braking system. However, tail lights responsive to the tension controlled braking systems found in many types of bicycles are currently unavailable. Moreover, tail light mechanisms employed on motorized cycles having hydraulic braking systems are generally incompatible with the tension controlled braking systems of conventional bicycles.

Hence, a need in the art exists for an active optical safety device for bicycles and other low speed vehicles which signals engagement of a tension controlled braking mechanism.

SUMMARY OF THE INVENTION

The need in the art for an optical safety apparatus for use in a vehicle having a tension controlled braking mechanism is addressed by the present invention. Included in the safety apparatus is a lamp means for emitting an optical braking signal and a mounting means for securing the lamp means to the vehicle. A switch means electrically connected to the lamp means controls emission of the braking signal in response to engagement of the braking mechanism. Included in a specific embodiment is a trifunctional lamp means for emitting an optical braking signal, for reflecting incident radiant energy and for generating an optical safety signal.

BRIEF DESCRIPTION OF THE DRAWINGS

FIG. 3a is a front cross-sectional view of the housing for the trifunctional lamp.

FIG. 3b is a side cross-sectional view of the housing for the trifunctional lamp.

FIG. 4 is a schematic diagram of the electronic circuitry of the present invention.

DETAILED DESCRIPTION OF THE INVENTION

Figure 1:
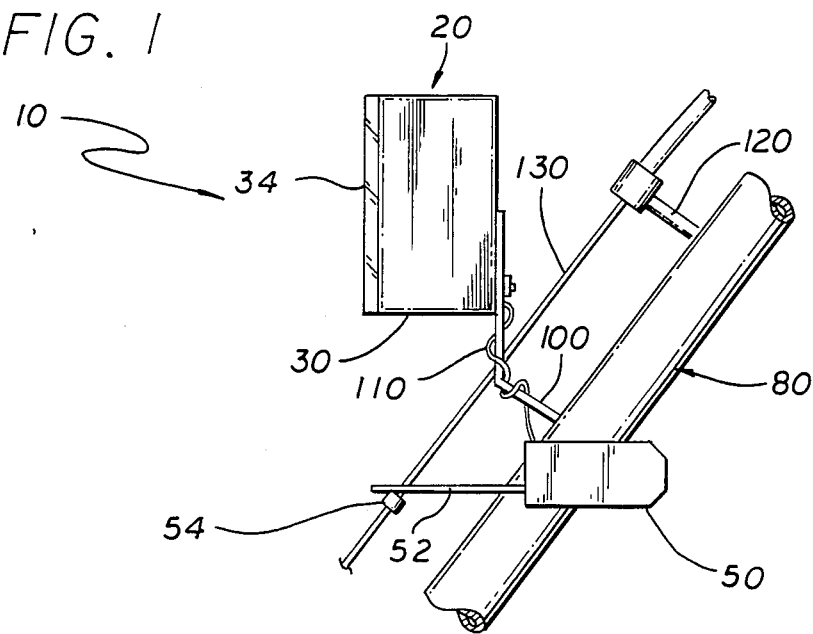
FIG. 1 is an illustrative embodiment of the optical safety apparatus of the present invention mounted on a vehicle having a tension controlled braking mechanism.

As shown in FIG. 1, a multi-purpose vehicle safety apparatus 10 of the present invention includes a trifunctional lamp 20 and electromechanical brake switch 50. A housing 30 of the trifunctional lamp 20 is anchored to a vehicle frame 80 by a rod 100. The brake switch 50 is attached to the frame 80 and is electrically connected to the trifunctional lamp 20 by a conducting wire 110. A cable guide 120, fixed to the vehicle frame 80, supports a brake cable 130.

Figure 2:
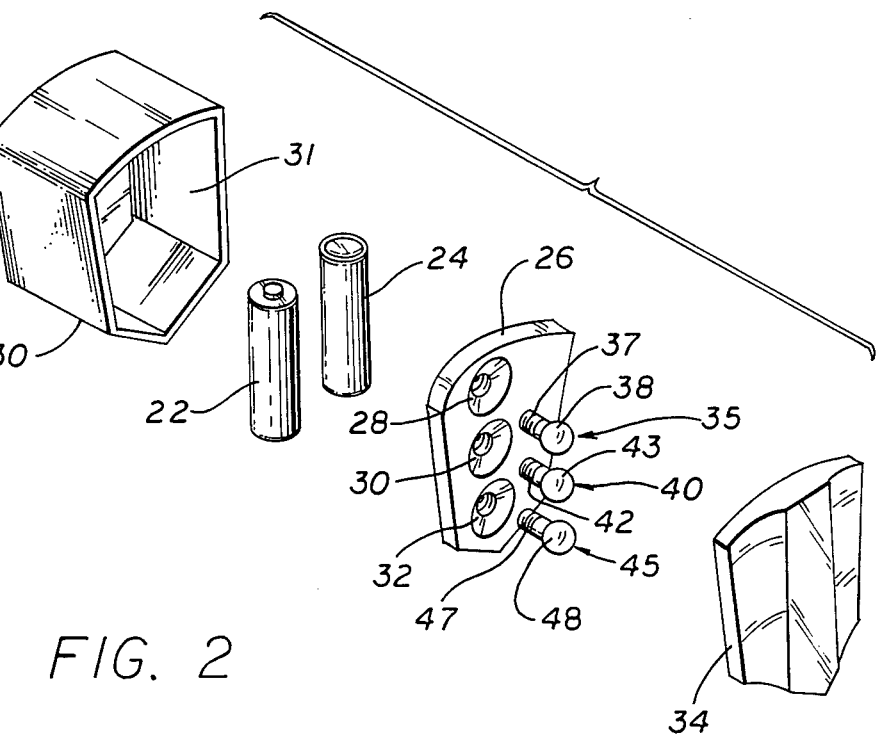
FIG. 2 is an illustrative view of the trifunctional lamp in disassembled relation.

Shown in FIG. 2 are elements comprising the trifunctional lamp 20. These elements include the housing 30, a pair of batteries 22 and 24, a mirror 26 with first, second and third holes 28, 30 and 32 and a reflector 34. Further included are first, second and third light bulbs 35, 40 and 45 having bases 37, 42 and 47 and having necks 38, 43 and 48, respectively.

The housing 30 is composed of molded ABS plastic painted black. The mirror 26 also is typically made of ABS plastic and is plated with an optically reflecting material which generally includes silver. The light bulbs 35, 40 and 45 preferably include krypton or a similar agent for improving luminosity. The reflector 34 is made of acrylic and usually colored red. Those skilled in the art are capable of designing the reflector 34 so that a first face of the reflector 34 reflects light energy, while light energy incident on a second face of the reflector 34 is transmitted. Thus, the reflector 34 may be mounted on the housing face 31 in an orientation allowing reflection of incident light energy external to the housing 30, and transmission of light energy emanating from within the housing 30.

FIG. 3a shows a cross sectional front view of the housing 30 with the reflector 34 (not shown) removed from the housing face 31. The rear wall of the housing 30 includes first, second and third cylindrical cavities 82, 84 and 86 for mounting first, second and third light bulb sockets 92, 94 and 96 (not shown). The first, second and third sockets 92, 94 and 96 are held respectively in the first, second and third cavities 82, 84 and 86 typically with glue or epoxy. The sockets 92, 94 and 96 are widely available and typically consist of a plastic material, annular in shape with threads molded on an interior surface for securing the base of a light bulb. An electrical contact is usually positioned on the floors of the sockets 92, 94 and 96 so as to form an electrical connection with an inserted light bulb. In an alternative embodiment the bulbs 35, 40 and 45 may be electrically connected and fastened to a printed circuit board disposed within the housing 30 thereby obviating the need for the sockets 92, 94 and 96.

A safety light switch 60 is mounted on the floor of the housing 30 and electrically connected to the second socket 94 and to the batteries 22 and 24. The switch 60 includes a mechanical toggle 64 protruding through the housing 30. When physically actuated by a vehicle operator the toggle 64 induces the switch 60 to electrically close. In this manner, electrical current to the second socket 94 may be controlled via the safety light switch 60. A double pole, single throw rocker switch manufactured by Matsushita comprises the safety light switch 60 in a preferred embodiment.

Depicted in FIG. 3b is a cross sectional side view of the housing 30. The batteries 22 and 24 are mounted within the housing 30 on either side of the cylindrical cavities 82, 84 and 86 using the battery supports 72 and 74. The mirror 26 is fixed within the housing 30 immediately to the left of the supports 72 and 74 in FIG. 3b. The bases 37, 42, and 47 of the light bulbs 35, 40 and 45 are anchored in the sockets 92, 94 and 96 while the bulb necks 38, 43, and 48 are straddled by the mirror holes 28, 30 and 32. The reflector 34 is mounted on the face of the housing 31.

Referring again to FIG. the electromechanical brake switch 50 includes a linkage 52 fastened to the brake cable 130 by an adjustable collar 54. A commercially available UNIMAX Snap Action Switch, micro V3L may be utilized as the switch 50. Application of a braking mechanism associated with the vehicle equipped with the multi-purpose vehicle safety apparatus 10 of the present invention results in movement of the brake cable 130. This movement is communicated to the brake switch 50 by the associated pivoting of the linkage 52. Pivoting of the linkage 52 results in momentary electrical closing of the brake switch 50. As shown in the electrical schematic diagram of FIG. 4 the first bulb 35 and the third bulb 45 are connected in parallel via the first socket 92 and the third socket 96. It then follows that momentary closing of the switch 50 in response to application of the vehicle braking mechanism results in current flow through the bulbs 35 and 45. This current flow results in emission of optical energy from the bulbs 35 and 45. Disengagement of the braking mechanism results in a second, oppositely directed movement of the brake cable 130 which induces a second pivoting of the linkage 52 and a subsequent electrical opening of the switch 50. An electrical braking signal is comprised of the optical energy emitted by the bulbs 5 and 45 between the aforementioned opening and closing of the brake switch 50.

Referring again to FIG. 1, the adjustable collar 54 may be positioned to inhibit operation of the brake switch 50. The switch 50 is activated in response to the relative angle between the linkage 52 and the switch 50. Hence, particular positioning of the collar 54 on the brake cable 130 can prevent the linkage 52 from subtending a sufficient angle relative to the switch 50 to effect electrical closing of the switch 50 upon motion of the cable 130. In this way application of the braking mechanism may be prevented from inducing the emission of an optical braking signal from the bulbs 35 and 45.

FIG. 4 also illustrates operation of the safety light switch 60. As previously mentioned, a vehicle operator can induce electrical closing of the switch 60 by physically switching the toggle 64. Closing the switch 60 results in current flow through the bulb 40 via the socket 94. Optical energy is radiated from the bulb 40 in response to this current. Returning the toggle 64 to its original position results in electrical opening of the switch 60 and a corresponding halt in current flow and radiation of optical energy from the bulb 40.

While the present invention has been described herein with reference to a particular embodiment, it is understood that the invention is not limited thereto. For example, the light bulbs 35, 40 and 45 may be replaced by other suitable light sources. Similarly, with access to the teachings of this invention it may be obvious to one of ordinary skill in the art to provide circuitry enabling a different number of light sources to be implemented within the trifunctional lamp 20. Further, the invention is not limited to the mechanical coupling arrangement between a tension controlled braking mechanism and the switch 50. Other suitable designs may be employed without departing from the scope of the invention. It is therefore contemplated by the appended claims to cover any and all such modifications.

Accordingly,

What is claimed is:

1. A multi-purpose optical safety apparatus for a vehicle having a tension controlled braking mechanism comprising:
    a housing including an aperture and three socket indentations;
    a first and a second light bulb socket mounted in two of said socket indentations with said first and second sockets electrically connected in parallel;
    a third light bulb socket mounted in the remaining socket indentation;
    four electrically conducting battery contacts attached within said housing;
    a pair of batteries secured within said housing by said battery contacts;
    mounting means for securing said housing to said vehicle;
    a mirror including three holes with relief areas for focusing light energy surrounding said holes, wherein said mirror is positioned within said housing with said three holes axially coincident with said three sockets;
    three light bulbs, each having a base and a neck, wherein the base of each is mounted in one of said sockets and the neck of each is circumscribed by one of said holes;
    a reflector attached to said housing and eclipsing said aperture;
    a manually actuated, electromechanical safety switch mounted on said housing and electrically coupled to said third socket, and
    an electromechanical braking switch mounted on said vehicle, electrically connected to said first and second sockets and having a mechanical extension fastened to said braking mechanism, wherein application of said braking mechanism induces motion in said extension and mometary closing of said braking switch.

2. A multi-purpose optical safety apparatus for a vehicle having a tension controlled braking mechanism comprising:
    trifunctional lamp means for reflecting incident radiant energy, for generating an optical safety signal, and for emitting an optical braking signal said trifunctional lamp means comprising:
    a plurality of light bulbs;

a plurality of light bulb sockets;

a housing including an aperture and further including a plurality of indentations for mounting said light bulb sockets;

a mirror having a plurality of holes enabling insertion of said light bulbs through said holes into said sockets; and a reflector mounted on said aperture which reflects incident radiant energy external to said housing whole allowing transmission of optical energy from within said housing;

mounting means for securing said trifunctional lamp means to said vehicle;

switch means electrically connected to said trifunctional lamp means, for controlling generation of said safety signal and for controlling emission of said braking signal in response to application of said braking mechanism; and power supply means for providing energy to said trifunctional lamp means.

3. The safety apparatus of claim 2 wherein said mirror further includes relief regions circumscribing said holes for focusing light energy from said bulbs.

* * * * *